UNITED STATES PATENT OFFICE.

RUDOLF BERENDES, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING THE CALCIUM SALT OF ACETYL SALICYLIC ACID.

1,020,181.  Specification of Letters Patent.  Patented Mar. 12, 1912.

No Drawing.  Application filed September 12, 1911.  Serial No. 648,994.

*To all whom it may concern:*

Be it known that I, RUDOLF BERENDES, doctor of philosophy, chemist, citizen of the German Empire, residing at Elberfeld, Germany, have invented new and useful Improvements in New Processes of Producing the Calcium Salt of Acetyl Salicylic Acid, of which the following is a specification.

My invention relates to a new and valuable process for the production of the calcium salt of acetyl salicylic acid having most probably the formula:

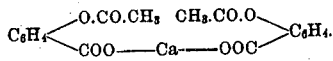

This process consists in treating an alkaline salt of acetyl salicylic acid with exception of the lithium salt with a calcium salt, such as calcium acetate, in which the calcium is combined with an acid which furnishes alkaline salts soluble in alcohols.

In order to illustrate the new process more fully the following example is given, the parts being by weight:—82 parts of calcium acetate are dissolved in 250 parts of water and the resulting solution is added to a solution of 202 parts of the sodium salt of acetyl salicylic acid in 2000 parts of methylalcohol. The calcium compound is filtered off and dried. It crystallizes from alcohol in the shape of colorless almost tasteless needles which are easily soluble in water furnishing a neutral solution. A yellowish-gray precipitate is obtained with ferric chlorid. It is a valuable soluble substitute for acetyl salicylic acid.

I claim:

1. The process for producing the calcium salt of acetyl salicylic acid, which process consists in treating an alkaline salt of acetyl salicylic acid with a calcium salt, substantially as described.

2. The herein described process for producing the calcium salt of acetyl salicylic acid, which process consists in treating an alkaline salt of acetyl salicylic acid with a calcium salt of an acid which yields with alkalis salts which are soluble in alcohols, substantially as described.

In testimony whereof I have hereunto set my hand in the presence of two subscribing witnesses.

RUDOLF BERENDES. [L. S.]

Witnesses:
L. NUFER,
ALBERT F. NUFER.